US008288043B2

(12) United States Patent
Manabe et al.

(10) Patent No.: US 8,288,043 B2
(45) Date of Patent: Oct. 16, 2012

(54) FUEL CELL SYSTEM AND MOBILE OBJECT

(75) Inventors: Kota Manabe, Toyota (JP); Kimihide Horio, Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 872 days.

(21) Appl. No.: 12/085,386

(22) PCT Filed: Nov. 21, 2006

(86) PCT No.: PCT/JP2006/323628
§ 371 (c)(1),
(2), (4) Date: May 22, 2008

(87) PCT Pub. No.: WO2007/066531
PCT Pub. Date: Jun. 14, 2007

(65) Prior Publication Data
US 2009/0148736 A1    Jun. 11, 2009

(30) Foreign Application Priority Data

Dec. 5, 2005    (JP) ................................ 2005-350403

(51) Int. Cl.
*H01M 8/04*    (2006.01)
(52) U.S. Cl. ........ 429/428; 429/430; 429/431; 429/432; 429/443; 429/444
(58) Field of Classification Search ................... 429/423
See application file for complete search history.

(56) References Cited

U.S. PATENT DOCUMENTS

| 6,329,089 B1 | 12/2001 | Roberts et al. |
| 2002/0038732 A1 | 4/2002 | Sugiura et al. |
| 2002/0182467 A1 * | 12/2002 | Ballantine et al. ............ 429/26 |
| 2003/0211372 A1 * | 11/2003 | Adams et al. .................. 429/23 |
| 2009/0148735 A1 * | 6/2009 | Manabe et al. ................ 429/23 |

FOREIGN PATENT DOCUMENTS

| DE | 11 2006 003 141 T5 | 10/2008 |
| JP | 11-154520 A | 6/1999 |
| JP | 11-176454 A | 7/1999 |
| JP | 2000-48845 A | 2/2000 |
| JP | 2000048845 A * | 2/2000 |
| JP | 2002-63927 A | 2/2002 |

(Continued)

OTHER PUBLICATIONS

English translation of JP 2002246053 A. Original document submitted in IDS.*

(Continued)

*Primary Examiner* — Ula C Ruddock
*Assistant Examiner* — Scott J Chmielecki
(74) *Attorney, Agent, or Firm* — Kenyon & Kenyon LLP (57) ABSTRACT

There is disclosed a fuel cell system or the like capable of stably operating an auxiliary machine and the like, even when recovering a poisoned electrode catalyst and warming up a fuel cell. A controller derives a target operation point sufficient for recovering activity of the poisoned electrode catalyst, and realizes shift of an operation point to a target operation point in a state in which an output power is held to be constant. The operation is switched to a low-efficiency operation point, whereby an output voltage of the fuel cell lowers, but the voltage is raised to an allowable input voltage of a high-voltage auxiliary machine by a DC/DC converter.

5 Claims, 7 Drawing Sheets

FOREIGN PATENT DOCUMENTS

| | | |
|---|---|---|
| JP | 2002-118981 A | 4/2002 |
| JP | 2002-184442 A | 6/2002 |
| JP | 2002-246053 A | 8/2002 |
| JP | 2002246053 A * | 8/2002 |
| JP | 2003-504807 A | 2/2003 |
| JP | 2004-48891 A | 2/2004 |
| JP | 2004-311112 A | 11/2004 |
| JP | 2005-108773 A | 4/2005 |
| JP | 2006-286513 A | 10/2006 |

OTHER PUBLICATIONS

English translation of JP 2000048845 A. Original documnet submitted in IDS.*

* cited by examiner

<USUAL OPERATION>

FIG. 2B

<LOW-EFFICIENCY OPERATION>

FUEL CELL SYSTEM AND MOBILE OBJECT

This is a 371 national phase application of PCT/JP2006/323628 filed 21 Nov. 2006, which claims priority of Japanese Patent Application No. 2005-350403 filed 05 Dec. 2005, the contents of which are incorporated herein by reference.

TECHNICAL FIELD

The present invention relates to a fuel cell system and a mobile object on which the system is mounted.

BACKGROUND ART

In general, a fuel cell has a poor starting property as compared with another power source. A power generation efficiency of such a fuel cell decreases owing to lowering of a temperature and a poisoned electrode catalyst, and a desired voltage/current cannot be supplied, so that an apparatus cannot be started sometimes.

In view of such a situation, a method is suggested in which at least one of an anode fuel (e.g., a fuel gas) and a cathode fuel (e.g., an oxidizing gas) to be supplied to electrodes is brought into a shortage state, and an overvoltage of a part of the electrodes is increased to raise a temperature of the fuel cell, whereby the poisoned electrode catalyst is recovered and the fuel cell is warmed up (e.g., see Patent Document 1).

[Patent Document 1] Japanese Patent Publication No. 2003-504807

DISCLOSURE OF THE INVENTION

However, in a case where a poisoned electrode catalyst is recovered and a fuel cell is warmed up by the above method, a voltage of the fuel cell lowers during such an operation, and there has been a problem that auxiliary machines cannot stably be operated.

In view of the above-mentioned situations, the present invention has been developed, and an object thereof is to provide a fuel cell system or the like capable of stably operating auxiliary machines, even when recovering a poisoned electrode catalyst and warming up a fuel cell.

To achieve the above object, a fuel cell system according to the present invention comprises: a fuel cell; a voltage conversion device; a power accumulation device connected in parallel with the fuel cell via the voltage conversion device; an auxiliary machine connected to the power accumulation device; operation control means for operating the fuel cell at a low-efficiency operation point having a power loss larger than that of a usual operation point, in a case where predetermined conditions are satisfied; and voltage conversion control means for controlling a voltage converting operation of the voltage conversion device based on the operation point of the fuel cell and a driving voltage of the auxiliary machine.

According to such a constitution, even when the fuel cell is operated at the low-efficiency operation point in order to recover the poisoned electrode catalyst and warm up the fuel cell, the voltage converting operation of the voltage conversion device is controlled based on the operation point of the fuel cell and the driving voltage of the auxiliary machine. Therefore, the auxiliary machine can constantly stably be operated irrespective of the operation point of the fuel cell.

Here, in the above constitution, a configuration is preferable in which the voltage conversion control means allows the voltage conversion device to raise a terminal voltage of the fuel cell corresponding to the operation point to at least the driving voltage of the auxiliary machine.

Moreover, a configuration is preferable in which the operation control means operates the fuel cell at the low-efficiency operation point in a case where a warm-up operation of the fuel cell is required or an operation to recover a catalyst activity of the fuel cell is required. Furthermore, a configuration is preferable in which the operation control means generates an oxidizing gas shortage state, and then operates the fuel cell at the low-efficiency operation point.

In addition, a mobile object according to the present invention is a mobile object on which the fuel cell system having the above constitution is mounted and in which a motor is used as a power source, characterized in that in a case where the motor is connected to a power accumulation device side and a fuel cell is operated at a low-efficiency operation point, the motor is driven using at least one of a discharge power of the power accumulation device or an output power of the fuel cell having a voltage thereof raised by a converter.

Moreover, another mobile object according to the present invention is a mobile object on which the fuel cell system having the above constitution is mounted and in which a motor is used as a power source, characterized in that in a case where the motor is connected to a fuel cell side and a fuel cell is operated at a low-efficiency operation point, driving of the motor is stopped, or an output of the motor is limited to drive the motor.

As described above, according to the present invention, even when the poisoned electrode catalyst is recovered or the fuel cell is warmed up, the auxiliary machine and the like can stably be operated.

BEST MODE FOR CARRYING OUT THE INVENTION

An embodiment according to the present invention will hereinafter be described with reference to the drawings.

A. Present Embodiment

Figure 1:
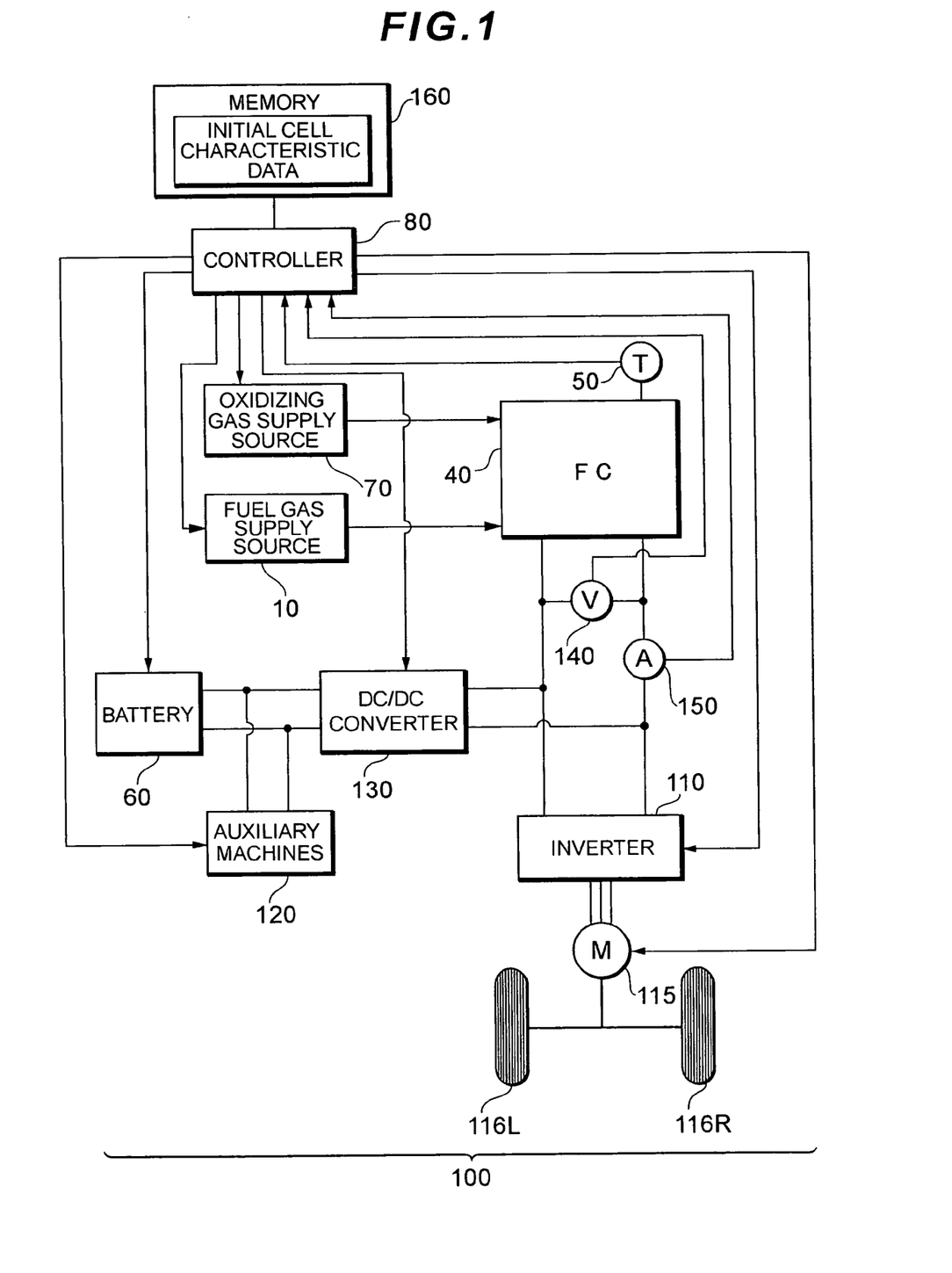
FIG. 1 is a diagram showing a constitution of a main part of a fuel cell system according to the present embodiment.

FIG. 1 is a diagram showing a constitution of a main part of a fuel cell system 100 according to the present embodiment. In the present embodiment, a fuel cell system is assumed which is to be mounted on vehicles such as a fuel cell hybrid vehicle (FCHV), an electric car and a hybrid car, but the system is applicable to not only the vehicles but also various mobile objects (e.g., a ship, an airplane, a robot, etc.) and a stationary power source.

A fuel cell 40 is means for generating a power from a reactive gas (a fuel gas and an oxidizing gas) to be fed, and a fuel cell of any type such as a solid polymer type, a phosphate type or a dissolving carbonate type can be used. The fuel cell 40 has a stack structure in which a plurality of unitary cells including an MEA and the like are laminated in series. An output voltage (hereinafter referred to as the FC voltage) and an output current (hereinafter referred to as the FC current) of this fuel cell 40 are detected by a voltage sensor 140 and a current sensor 150, respectively. A fuel gas such as a hydrogen gas is fed from a fuel gas supply source 10 to a fuel pole (an anode) of the fuel cell 40, whereas an oxidizing gas such as air is fed from an oxidizing gas supply source 70 to an oxygen pole (a cathode).

The fuel gas supply source 10 is constituted of, for example, a hydrogen tank, various valves and the like, and valve open degrees, ON/OFF time and the like are adjusted to control an amount of the fuel gas to be fed to the fuel cell 40.

The oxidizing gas supply source 70 is constituted of, for example, an air compressor, a motor which drives the air compressor, an inverter and the like, and a rotation number of the motor and the like are adjusted to adjust an amount of the oxidizing gas to be fed to the fuel cell 40.

A battery (a power accumulation device) 60 is a chargeable/dischargeable secondary cell, and constituted of, for example, a nickel hydrogen battery or the like. Needless to say, instead of the battery 60, a chargeable/dischargeable accumulator (e.g., a capacitor) may be disposed except the secondary cell. This battery 60 is connected in parallel with the fuel cell 40 via a DC/DC converter 130.

An inverter 110 is, for example, a PWM inverter of a pulse width modulation system, and converts a direct-current power output from the fuel cell 40 or the battery 60 into a three-phase alternate-current power in response to a control command given from a controller 80, to supply the power to a traction motor 115. The traction motor 115 is a motor (i.e., a power source of a mobile object) to drive wheels 116L, 116R, and the rotation number of such a motor is controlled by the inverter 110. This traction motor 115 and the inverter 110 are connected to a fuel cell 40 side.

The DC/DC converter (a voltage conversion device) 130 is a full bridge converter constituted of, for example, four power transistors and a drive circuit for exclusive use (both are not shown). The DC/DC converter 130 has a function of raising or lowering a DC voltage input from the battery 60 to output the voltage toward the fuel cell 40, and a function of raising or lowering a DC voltage input from the fuel cell 40 or the like to output the voltage toward the battery 60. The functions of the DC/DC converter 130 realize charging/discharging of the battery 60.

Auxiliary machines 120 such as vehicle auxiliary machines and FC auxiliary machines are connected between the battery 60 and the DC/DC converter 130. The battery 60 is a power source for these auxiliary machines 120. It is to be noted that the vehicle auxiliary machines are various power apparatuses for use in operating the vehicle and the like (a lighting apparatus, an air conditioner, a hydraulic pump, etc.), and the FC auxiliary machines are various power apparatuses for use in operating the fuel cell 40 (pumps for feeding the fuel gas and the oxidizing gas, etc.).

The controller 80 is constituted of a CPU, an ROM, an RAM and the like, and system sections are centrically controlled based on sensor signals input from a temperature sensor 50 which detects a temperature of the fuel cell 40, an SOC sensor which detects a charged state of the battery 20, an accelerator pedal sensor which detects an open degree of an accelerator pedal and the like.

Moreover, the controller 80 detects by the following method whether or not an electrode catalyst of the fuel cell 40 is poisoned. In a case where it is detected that the catalyst is poisoned, the controller performs processing to switch an operation point of the fuel cell 40 so as to recover characteristics of the poisoned electrode catalyst (described later).

A memory 160 is, for example, a rewritable nonvolatile memory in which initial cell characteristic data indicating cell characteristics in an initial state (e.g., during shipping of a manufactured cell) of the fuel cell 40 and the like are stored. The initial cell characteristic data is a two-dimensional map showing a relation between a current density and a voltage of the fuel cell 40 in the initial state, and the voltage lowers as the current density increases.

As is known, when the electrode catalyst of the fuel cell 40 is poisoned, the cell characteristics lower. With the equal voltage, the current density after poisoning decreases as compared with that before the poisoning (the current density indicated by the initial cell characteristic data). In the present embodiment, the FC voltage and the FC current detected by the voltage sensor 140 and the current sensor 150 are compared with the initial cell characteristic data by use of the above-mentioned characteristics, to detect whether or not the electrode catalyst is poisoned. More specifically, when the voltage sensor 140 and the current-sensor 150 detect the FC voltage and the FC current, the controller (detection means) 80 compares the detection result with the current density at the equal voltage in the initial cell characteristic data. As a result of such comparison, when the following formulas (1), (2) are established, it is judged that the electrode catalyst is poisoned. On the other hand, when the following formulas (1), (2) are not established, it is judged that the electrode catalyst is not poisoned.

$$Vfc=Vs \tag{1), and}$$

$$Ifc<Is+\alpha \tag{2},$$

in which Vfc; an FC voltage,

Vs; a voltage in the initial cell characteristic data,

Ifc; an FC current,

Is; a current density in the initial cell characteristic data, and

α; a predetermined value.

It is to be noted that in the above description, it is detected using the initial cell characteristic data whether or not the electrode catalyst is poisoned, but needless to say, it may be detected by another method whether or not the electrode catalyst is poisoned. For example, when the electrode catalyst is poisoned by carbon monoxide, a known CO concentration sensor is provided, and a relation between a CO concentration and a measured voltage value may beforehand be inspected and mapped to detect, based on the detected CO concentration or the like, whether or not the electrode catalyst is poisoned. The operation point of the fuel cell 40 will hereinafter be described with reference to the drawing.

Figure 2A:
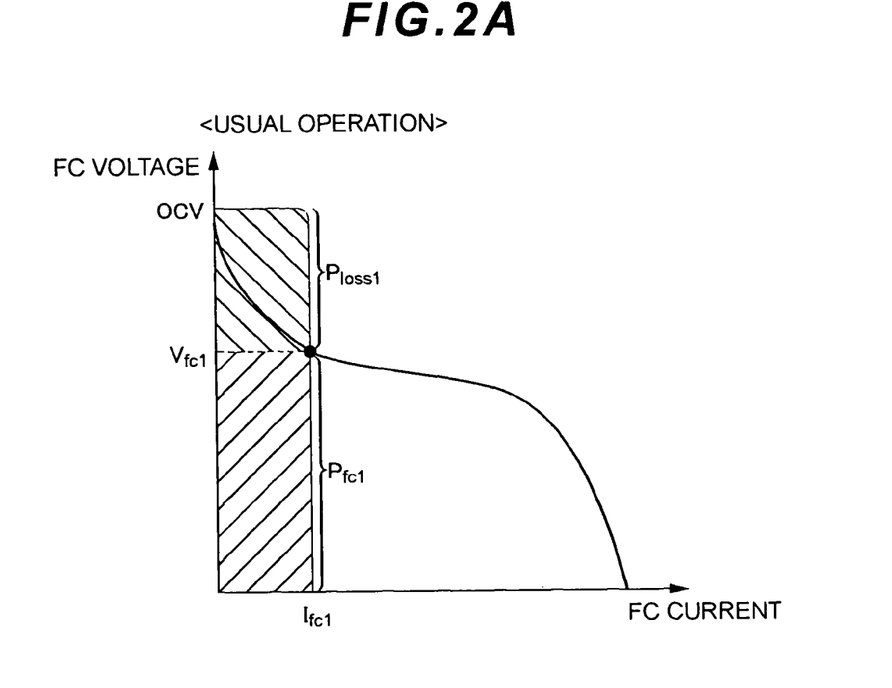
FIG. 2A is a diagram showing a relation between an output power and a power loss according to the embodiment.
Figure 2B:
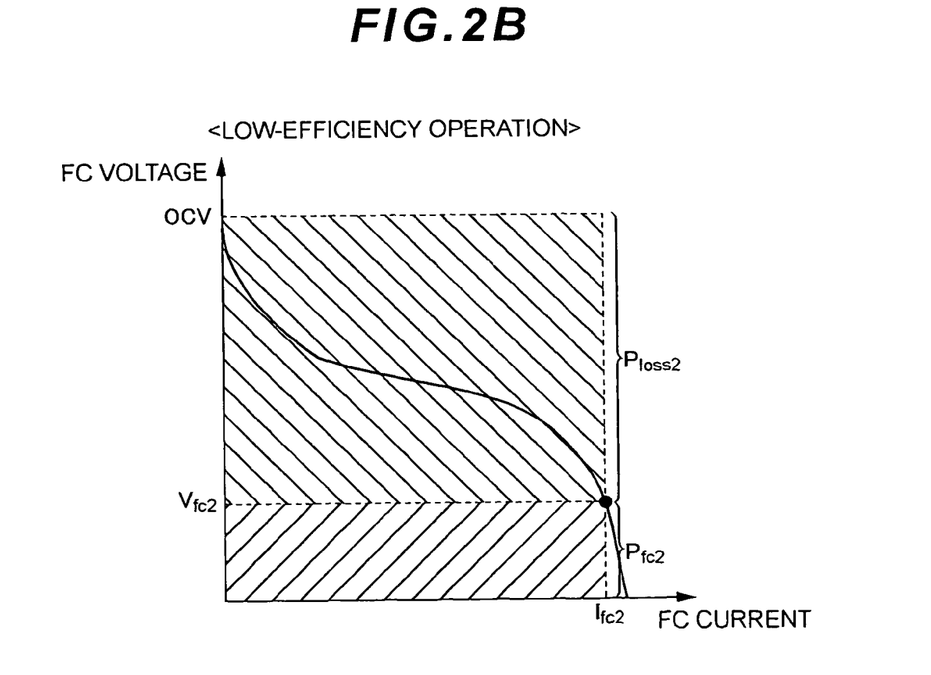
FIG. 2B is a diagram showing a relation between the output power and the power loss according to the embodiment.

FIGS. 2A and 2B are diagrams showing a relation between an output power and a power loss at a time when the fuel cell is operated at different operation points. The abscissa indicates the FC current and the ordinate indicates the FC voltage. Moreover, an open circuit voltage (OCV) shown in FIGS. 2A and 2B is a voltage in a state in which any current is not circulated through the fuel cell.

The fuel cell 40 capable of obtaining the current and voltage characteristics (hereinafter referred to as the IV characteristic) shown in FIGS. 2A and 2B is usually operated at an operation point (Ifc1, Vfc1) at which the power loss is small with respect to the output power (see FIG. 2A. However, when the electrode catalyst of the fuel cell 40 is poisoned, an inner temperature of the fuel cell 40 needs to be raised to recover activity of the electrode catalyst. Therefore, in the present embodiment, the operation of the fuel cell shifts to an operation point (Ifc2, Vfc2) having a large power loss while securing a necessary output power, thereby recovering the activity of the poisoned electrode catalyst (see FIG. 2B). Here, output powers Pfc at the operation points shown in FIGS. 2A and 2B, a power loss Ploss, a relation between the output voltages Pfc and a relation between the power losses Ploss are as follows.

<Concerning the Operation Point (Ifc, Vfc1)>

$$Ifc1 * Vfc1 = Pfc1 \quad (3)$$

$$Ifc1 * OCV - Pfc1 = Ploss1 \quad (4)$$

<Concerning the Operation Point (Ifc2, Vfc2)>

$$Ifc2 * Vfc2 = Pfc2 \quad (5)$$

$$Ifc2 * OCV - Pfc2 = Ploss2 \quad (6)$$

<Relations Between the Output Powers and Between the Power Losses>

$$Pfc1 = Pfc2 \quad (7)$$

$$Ploss1 < Ploss2 \quad (8)$$

Figure 3:
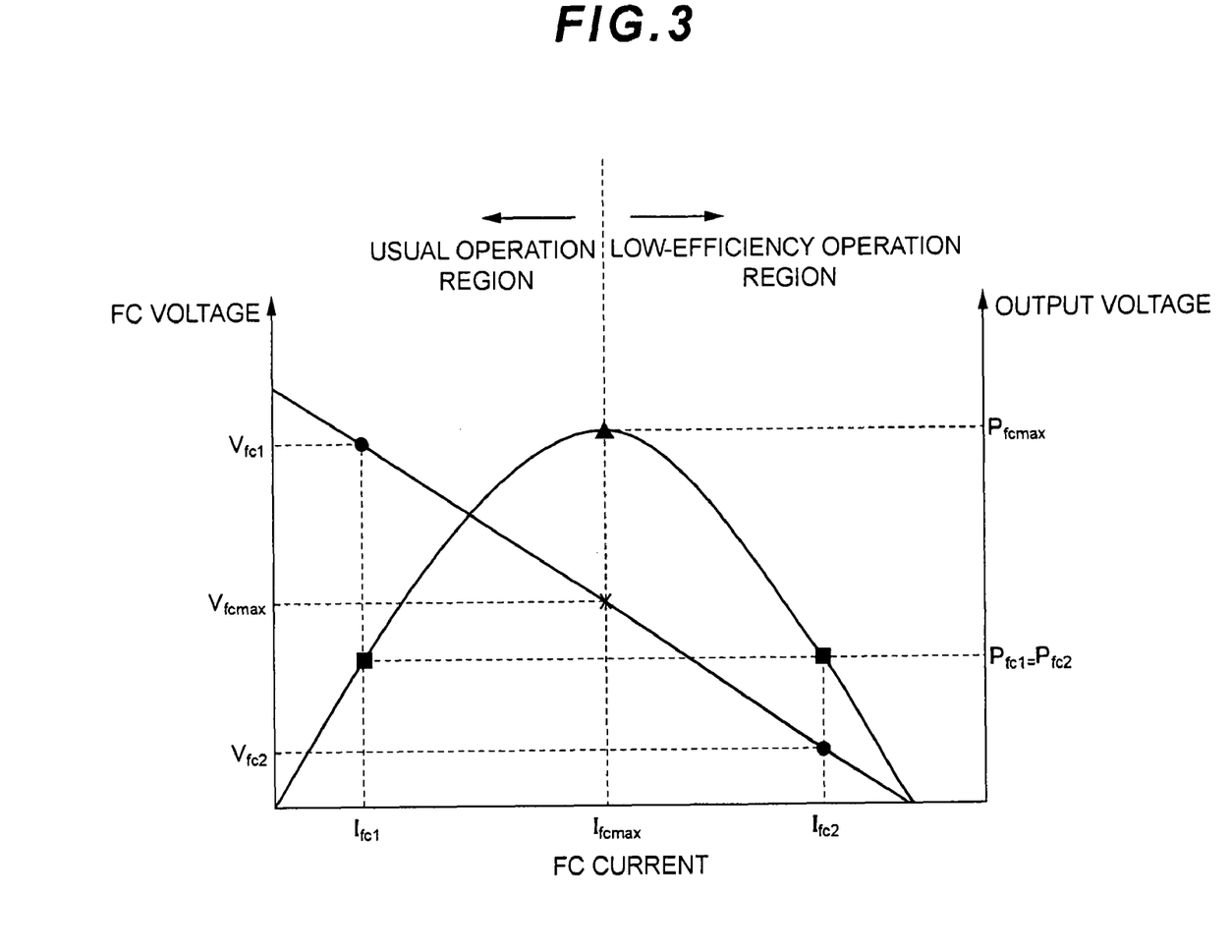
FIG. 3 is a diagram showing changes of the output power according to the embodiment.

FIG. 3 is a diagram showing changes of the output power at a time when the fuel cell is operated while the operation point is shifted. The abscissa indicates the FC current, and the ordinate indicates the FC voltage and the output power. It is to be noted that in FIG. 3, for the sake of convenience, the IV characteristic of the fuel cell is shown with a straight line (hereinafter referred to as the IV line). Operation points (Ifc1, Vfc1), (Ifc2, Vfc2) on the IV line correspond to the operation points (Ifc1, Vfc1), (Ifc2, Vfc2) shown in FIGS. 2A and 2B.

As shown in FIG. 3, with regard to the output power Pfc of the fuel cell 40, as the FC voltage Vfc decreases, the output power Pfc increases at an operation point on the IV line shown on the left side of a maximum output operation point (Ifcmax, Vfcmax) at which a maximum output power Pfcmax is obtained. On the other hand, at an operation point on the IV line shown on the right side of the maximum output operation point, the output power Pfc decreases, as the FC voltage Vfc decreases.

As described above, the power loss Ploss increases, as the FC voltage Vfc decreases. Therefore, even when the fuel cell 40 is operated to output the equal power, the power loss Ploss is large in a case where the fuel cell is operated at the operation point on the IV line shown on the right side of the maximum output operation point (e.g., the operation point (Ifc1, Vfc1)) as compared with a case where the fuel cell is operated at the operation point on the IV line shown on the left side of the maximum output operation point (e.g., the operation point (Ifc2, Vfc2)). Therefore, in the following description, the operation point on the IV line at which the output power Pfc increases with the decrease of the FC voltage Vfc is defined as a usual operation point, and the operation point on the IV line at which the output power Pfc decreases with the decrease of the FC voltage Vfc is defined as a low-efficiency operation point. It is to be noted that the usual operation point and the low-efficiency operation point are as follows.

<Concerning the Usual Operation Point (Ifc, Vfc)>

$$Ifc \leq Ifcmax \quad (9)$$

$$Vfcmax \leq Vfc \quad (10)$$

<Concerning the Low-Efficiency Operation Point (Ifc, Vfc)>

$$Ifcmax < Ifc \quad (11)$$

$$Vfc < Vfcmax \quad (12)$$

Next, the operation point shift processing to be executed by the controller 80 will be described with reference to FIG. 4 and the like.

Figure 4:
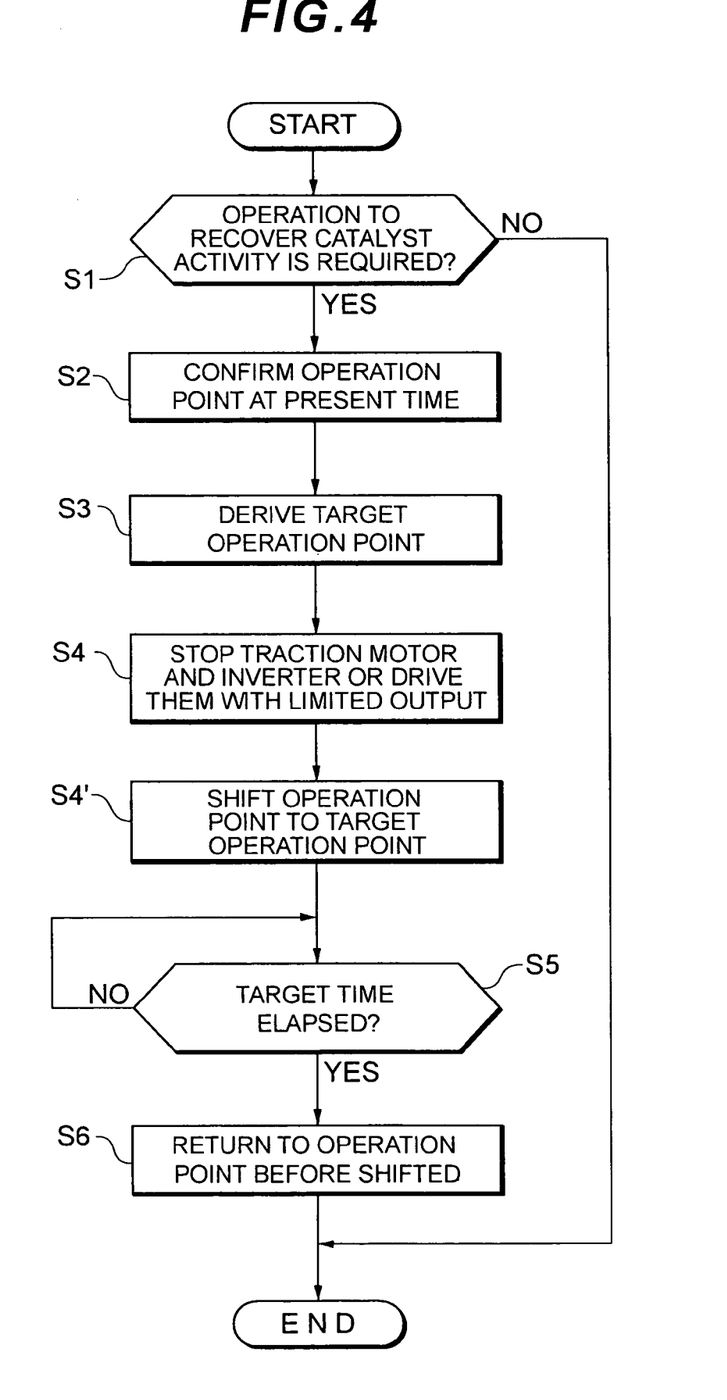
FIG. 4 is a flow chart showing shift processing of an operation point according to the embodiment.
Figure 5A:
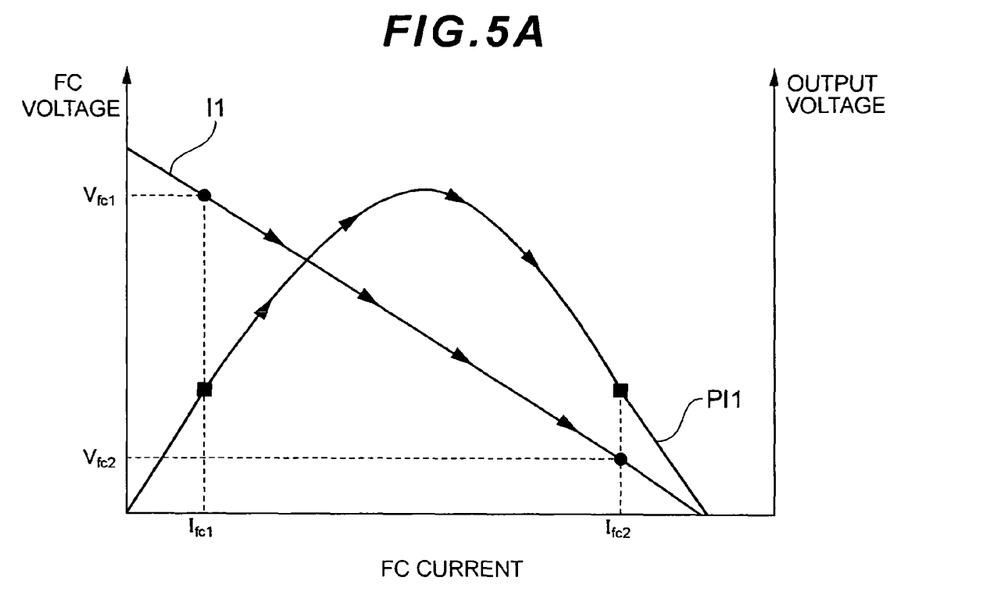
FIG. 5A is a diagram showing changes of the output power according to the embodiment.
Figure 5B:
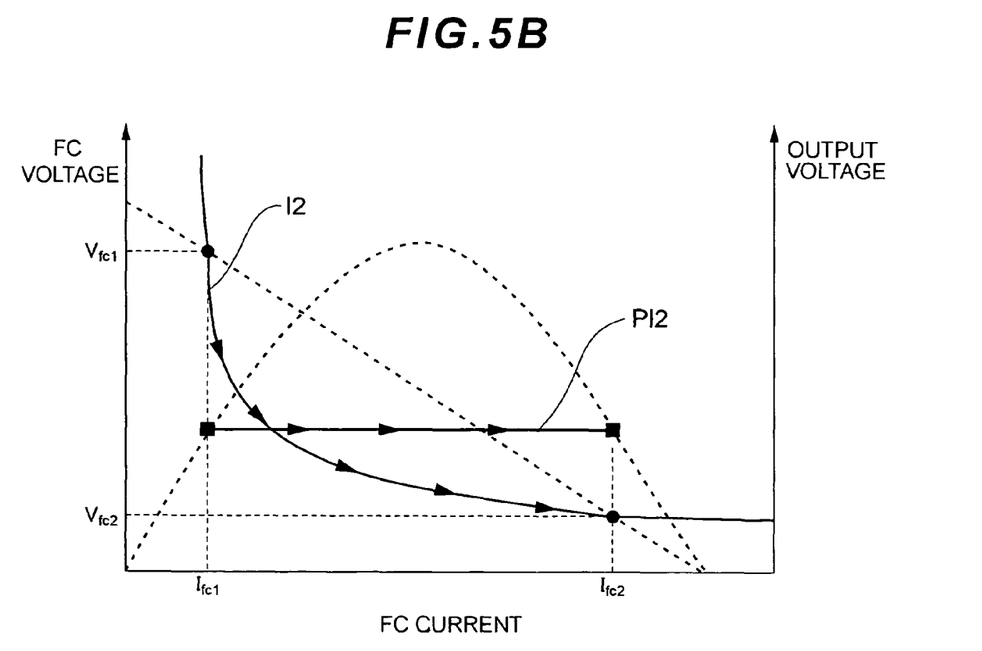
FIG. 5B is a diagram showing changes of the output power according to the embodiment.

FIG. 4 is a flow chart showing the shift processing of the operation point, and FIGS. 5A and 5B are diagrams showing changes of the output power at a time when the operation point is shifted. It is to be noted that in the following description, it is assumed that the operation point of the fuel cell 40 is shifted from the usual operation point (Ifc1, Vfc1) to the low-efficiency operation point (Ifc2, Vfc2) in order to recover the activity of the poisoned electrode catalyst (see FIGS. 5A and 5B).

The controller judgment means) 80 first judges whether or not an operation to recover a catalyst activity is required (step S1). Specifically, the FC voltage and the FC current detected by the voltage sensor 140 and the current sensor 150 are compared with the initial cell characteristic data to detect whether or not the electrode catalyst is poisoned. When the electrode catalyst is not poisoned, it is judged that the operation to recover the catalyst activity is not required. On the other hand, when the electrode catalyst is poisoned, it is judged that the operation to recover the catalyst activity is required.

When the electrode catalyst is not poisoned, the controller (operation control means) 80 continues operating at such a usual operation point as to output the power in response to system demand. On the other hand, when the electrode catalyst is poisoned, the controller 80 first confirms the operation point (here, the usual operation point (Ifc1, Vfc1)) at the present time (step S2).

Subsequently, the controller 80 derives an adequate operation point (the target operation point) of the fuel cell 40 so as to recover the activity of the poisoned electrode catalyst (step S3). One example will be described. For example, when the fuel cell is operated at the usual operation point (Ifc1, Vfc1) to obtain the output power Pfc1, the low-efficiency operation point (Ifc2, Vfc2) capable of obtaining the output power Pfc2 (=Pfc1) equal to the above output power is derived as the target operation point.

For example, when a power loss (i.e., an amount of heat required for raising the temperature) of the fuel cell 40 is Ploss2 and a demanded output power is Pfc2, the target operation point is derived by the following equations (13), (14).

<Concerning the Target Operation Point (Ifc, Vcf)>

$$Ifc = (Ploss2 + Pfc2)/OCV \quad (13)$$

$$Vfc = Pfc2 * OCV/(Ploss2 + Pfc2) \quad (14)$$

More specifically, in a case where the fuel cell 40 has a stack structure in which 300 cells are laminated, an OCV of 300 cell stack is 360 V, a demanded output power is 1 kW and a required amount of the heat is 20 kW, the target operation point is derived by the following equations (15), (14).

$$Ifc = (20+1)/360 = 58.3 \text{ A} \quad (15)$$

$$Vfc = 1 * 360/(20+1) = 17 \text{V} \quad (16)$$

It is to be noted that in the poisoned electrode catalyst, a cell voltage of the fuel cell 40 is controlled into 0.6 V or less, whereby a catalyst reducing reaction occurs to recover the catalyst activity. Therefore, the operation point which satisfies such conditions may be derived as the target operation point (details will be described later).

When the controller (the operation control means) 80 derives the target operation point, the traction motor 115 and the inverter 110 are stopped, and then shifting of the operation point starts (step S4→step S4'). Thus, to stop the traction motor 115 and the inverter 110, the operation is switched to the low-efficiency operation point, whereby the output voltage of the fuel cell 40 lowers below an allowable input voltage range of the inverter 110 or the like. However, driving of a high-voltage auxiliary machine connected to the battery 60 is not stopped. This is because even if a terminal voltage of the fuel cell 40 lowers, the output voltage of the fuel cell 40 is increased to an allowable input voltage of the high-voltage auxiliary machine by the DC/DC converter 130, whereby the driving can be continued. It is to be noted that the high-voltage auxiliary machine is an auxiliary machine in which the output voltage obtained at a time when the fuel cell 40 is operated at the usual operation point can satisfy a rated performance of a connected inverter. Therefore, when the fuel cell 40 is operated at the low-efficiency operation point, the controller (the voltage conversion control means) allows the DC/DC converter 130 to raise the terminal voltage of the fuel cell 40 to at least the allowable input voltage (the driving voltage) of the high-voltage auxiliary machine to continue the driving as described above. Needless to say, the above configuration is merely one example, and the driving may be performed in a state in which outputs (upper limit power) of the traction motor 115 and the like are limited without stopping the traction motor 115 and the inverter 110.

Here, in a case where the only FC voltage is controlled to shift the operation point from the usual operation point (Ifc1, Vfc1) to the low-efficiency operation point (Ifc2, Vfc2), as shown in FIG. 5A, the output power of the fuel cell 40 largely fluctuates in response to the shift of the operation point of an IV line 11 (see a power line pl1). More specifically, in a case where the only FC voltage is controlled using the DC/DC converter 130 to shift the operation point, in a shift process, there occurs necessity of performing a high-output operation (an operation at the maximum output operation point) which might not be performed in a usual use environment.

To solve the problem, in the present embodiment, as shown in FIG. 5B, the FC current is controlled together with the FC voltage to realize the shift of the operation point from the usual operation point (Ifc1, Vfc1) to the low-efficiency operation point (Ifc2, Vfc2) so that the output power is kept constant (see a power line p12). Specifically, the FC voltage is controlled using the DC/DC converter (a voltage conversion device) 130, and the controller (adjustment means) 80 adjusts an amount of the oxidizing gas to be fed from the oxidizing gas supply source 70 (here, reduces the amount of the oxidizing gas), to control the FC current. Such control is performed, whereby the IV characteristic of the fuel cell 40 shifts from the IV line 11 to an IV line 12, and the output power of the fuel cell 40 is kept constant regardless of the shift of the operation point.

Figure 6:
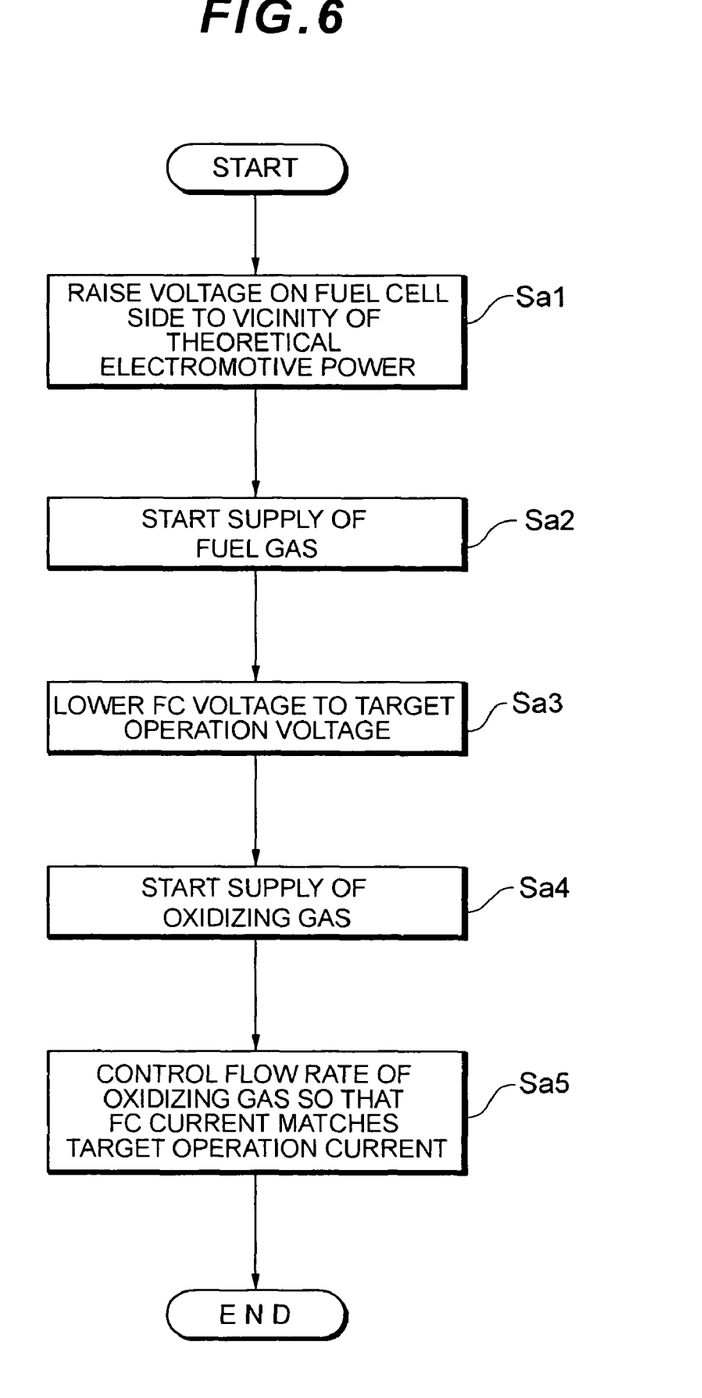
FIG. 6 is a diagram showing an operation sequence according to the embodiment.

A specific operation sequence will be described with reference to FIG. 6. First, the controller 80 allows the DC/DC converter 130 to raise the voltage on the side of the fuel cell to the vicinity of a theoretical electromotive power of the fuel cell 40, in other words, to the OCV or more (step Sa1). The controller 80 connects the fuel cell 40 to a relay (not shown) which electrically disconnects or connects the fuel cell 40 from or to the present system, and then starts supply of the fuel gas (step Sa2). However, at this time, supply of the oxidizing gas is not started. During such an operation, the OCV is generated in accordance with a remaining amount of the oxidizing gas. In a case where the controller (the operation control means) 80 allows the DC/DC converter 130 to lower the FC voltage to the target operation voltage Vfc2, and brings the fuel cell 40 on a cathode side into an oxidizing gas shortage state, the supply of the oxidizing gas is started in a state in which the FC voltage is held at the target operation voltage Vfc2 (step Sa3→step Sa4). The controller 80 controls a flow rate of the oxidizing gas into a flow rate around an air stoichiometric ratio of 1.0 so that the FC current matches the target operation current Ifc2 (step Sa5). The above-mentioned operation is performed, whereby the operation point of the fuel cell 40 is held to be constant irrespective of the shift of the operation point.

When the operation point is shifted in this manner, the controller 80 judges with reference to a timer (not shown) or the like whether or not a target set time has elapsed since the operation point was shifted (step S5). Here, the target set time is time (e.g., 10 seconds) adequate for recovering the activity of the electrode catalyst, and the time has elapsed since the operation was started at the low-efficiency operation point. The time can be obtained in advance by an experiment or the like. On judging that the target set time has not elapsed (step S5; NO), the controller 80 repeatedly executes the step S5. On the other hand, on judging that the target set time has elapsed (step S5; YES), the controller 80 returns the shifted operation point to the operation point before shifted (step S6), thereby ending the processing.

As described above, according to the fuel cell system of the present embodiment, even when the poisoned electrode catalyst is recovered, the high-voltage auxiliary machine driven with a high voltage can stably be operated.

It is to be noted that as described above, with regard to the poisoned electrode catalyst, the cell voltage of the fuel cell 40 is controlled into 0.6 V or less to recover the catalyst activity, so that the operation point may be derived as follows.

For example, in a case where the fuel cell 40 has a stack structure in which 300 cells are laminated and a demanded output power is 1 kW, if the cell voltage is set to 0.5 V (<0.6 V), the target operation point is as follows.

<Concerning the Target Operation Point (Ifc, Vfc)>

$$Vfc = 300 * 0.5 = 150 \text{ V} \tag{17}$$

$$Ifc = 1000/150 = 6.7 \text{ A} \tag{18}$$

Here, even in a case where the obtained target operation point is not present on the IV line before shifted, the FC current is controlled together with the FC voltage to change the IV characteristic, whereby the obtained target operation point can be positioned on the IV line.

B. Modification (1) In the above embodiment, the amount of the oxidizing gas to be supplied from the oxidizing gas supply source 70 is adjusted to control the FC current. However, an amount of a fuel gas to be supplied from a fuel gas supply source 10 may be adjusted to control the FC current.

(2) In the above embodiment, in a case where it is detected that the electrode catalyst is poisoned, the operation point of the fuel cell 40 is shifted from the usual operation point to the low-efficiency operation point, but the operation point may be shifted at the following timing.

For example, a fuel cell may be operated once at a low-efficiency operation point during starting of a system, and then the operation point may be shifted to a usual operation point to perform a system operation in a state in which a catalyst activity is constantly raised. When a demanded output power is a predetermined value or less (e.g., around an idle output or the like), the operation point may be shifted from the usual operation point to the low-efficiency operation point. Furthermore, after the system stops, the operation may be performed at the low-efficiency operation point to recover the lowered catalyst activity during the operation in preparation for the next starting.

(3) In the above embodiment, it is constituted that the operation point of the fuel cell 40 is shifted from the usual operation point to the low-efficiency operation point in order to recover the activity of the poisoned electrode catalyst, but the present invention is applicable to any case that requires a warm-up operation, for example, a case where the warm-up operation is performed during the starting at a low temperature, a case where the warm-up operation is rapidly performed before stopping the system operation and the like.

One example will be described. On receiving a starting command of the system from an operation switch or the like, a controller 80 detects an inner temperature of a fuel cell 40 by use of a temperature sensor 50 or the like. The controller (judgment means) 80 judges that the warm-up operation is required in a case where the inner temperature of the fuel cell 40 is below a preset threshold temperature, and the shift processing of the operation point shown in FIG. 4 is executed. The subsequent operation is similar to that of the present embodiment, and hence description thereof is omitted. It is to be noted that instead of the temperature sensor 50, a temperature sensor to detect an outside air temperature, a temperature sensor to detect a temperature of a refrigerant flowing through a cooling mechanism (not shown) or the like may be used.

Figure 7:
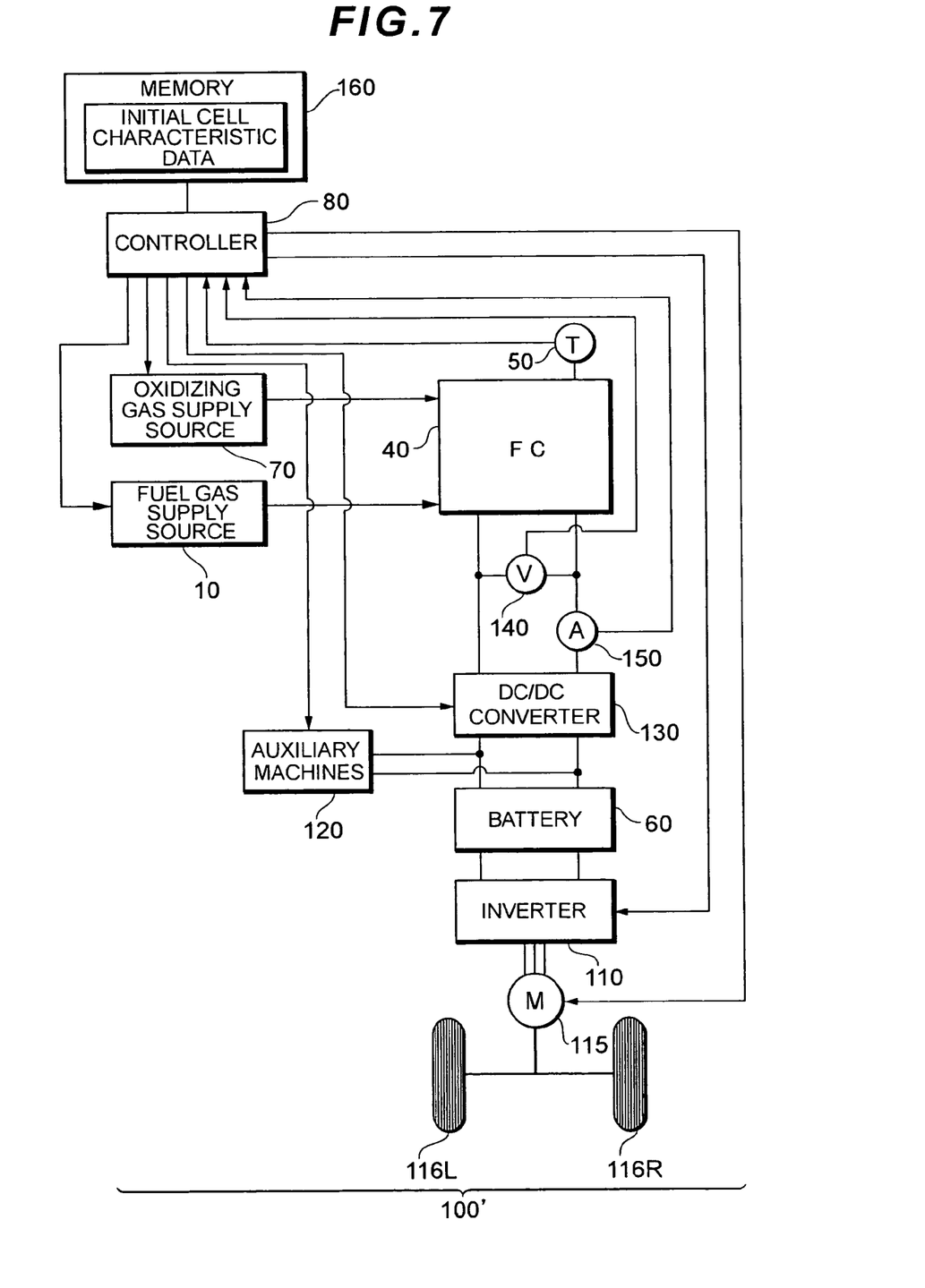
FIG. 7 is a diagram showing a constitution of a main part of a fuel cell system according to a modification.

(4) In the above embodiment, a constitution in which an output end of the fuel cell is connected to the inverter 110 for the traction motor has been described as an example. However, for example, as shown in FIG. 7, a battery 60 may be connected to a traction motor 115 and the inverter 110. It is to be noted that in a fuel cell system 100' shown in FIG. 7, components corresponding to those of the fuel cell system 100 shown in FIG. 1 are denoted with the same reference numerals, and detailed description thereof is omitted. According to such a constitution, even when an operation is switched to a low-efficiency operation point, the traction motor 115 and the inverter 110 can be driven with a discharge power of the battery 60. In other words, it is not necessary to stop the traction motor 115 and the inverter 110 at a time when the operation is switched from a usual operation point to the low-efficiency operation point or to drive the traction motor and the inverter with a limited output (step S4), whereby a system efficiency can be increased. Needless to say, the traction motor 115 and the like may be driven with the discharge power of the battery 60, but the traction motor 115 and the like may be driven with an output voltage of a fuel cell 40 having a voltage raised by a DC/DC converter 130 and the discharge power of the battery 60. Furthermore, the traction motor 115 and the like may be driven with the only output voltage of the fuel cell 40 having the voltage thereof raised by the DC/DC converter 130.

Moreover, in the present embodiment, a hybrid power source system including the fuel cell 40 and the battery 60 has been described as an example, but the present invention is also applicable to a power source system including the fuel cell 40 only.

The invention claimed is:

1. A fuel cell system comprising:
   a fuel cell;
   a voltage conversion device;
   a power accumulation device connected in parallel with the fuel cell via the voltage conversion device;
   an auxiliary machine connected to the power accumulation device;
   an operation control device programmed to:
      determine whether predetermined conditions are satisfied, shifting an operation point of the fuel cell to a low-efficiency operation point, and holding an output power of the fuel cell constant during the shifting by controlling the voltage converting device to lower a terminal voltage of the fuel cell and generating an oxidizing gas shortage state; and
      control a voltage converting operation of the voltage conversion device based on the operation point of the fuel cell and a driving voltage of the auxiliary machine.

2. The fuel cell system according to claim 1, wherein the operation control device is further programmed to allow the voltage conversion device to raise the terminal voltage of the fuel cell corresponding to the operation point to at least the driving voltage of the auxiliary machine.

3. The fuel cell system according to claim 2, wherein the operation control device operates the fuel cell at the low-efficiency operation point in a case where a warm-up operation of the fuel cell is required or an operation to recover a catalyst activity of the fuel cell is required.

4. A mobile object on which the fuel cell system according to claim 1 is mounted and in which a motor is used as a power source,
   wherein, in a case where the motor is connected to a power accumulation device side and a fuel cell is operated at a low-efficiency operation point, the motor is driven using at least one of a discharge power of the power accumulation device or an output power of the fuel cell having a voltage thereof raised by a converter.

5. A mobile object on which the fuel cell system according to claim 1 is mounted and in which a motor is used as a power source,
   wherein, in a case where the motor is connected to a fuel cell side and a fuel cell is operated at a low-efficiency operation point, driving of the motor is stopped, or an output of the motor is limited to drive the motor.

* * * * *